April 28, 1931.   T. T. ALLEN ET AL   1,803,087
SAFETY DEVICE OPERATING MECHANISM
Filed Oct. 12, 1927   3 Sheets-Sheet 2

WITNESSES:
Alfred E. Ockinger
W. P. Muriet

INVENTORS:
Thomas T. Allen &
John Francis Adams,
BY
Joshua R.H. Potts
ATTORNEY.

April 28, 1931.  T. T. ALLEN ET AL  1,803,087
SAFETY DEVICE OPERATING MECHANISM
Filed Oct. 12, 1927  3 Sheets-Sheet 3

WITNESSES:

INVENTORS:
Thomas T. Allen &
John Francis Adams,
BY
ATTORNEY.

Patented Apr. 28, 1931

1,803,087

UNITED STATES PATENT OFFICE

THOMAS T. ALLEN AND JOHN FRANCIS ADAMS, OF PHILADELPHIA, PENNSYLVANIA, ASSIGNORS TO SENTRY SAFETY CONTROL CORPORATION, OF PHILADELPHIA, PENNSYLVANIA

SAFETY-DEVICE-OPERATING MECHANISM

Application filed October 12, 1927. Serial No. 225,807.

This invention relates to safety devices for motion picture projecting machines and particularly to mechanisms for operating such devices when the film breaks, slips, or moves substantially out of its normal path.

In the operation of motion picture projecting machines it frequently happens that the film is not uniformly fed under the aperture plate by the sprockets which engage the perforations in the sides of the film and, consequently, the loop which is maintained above the aperture plate is either greatly lengthened so as to "pile up", or the loop may be diminished until the film is torn or broken.

One of the most frequent causes of such a condition is torn perforations or sprocket holes in the sides of the film, although other conditions may contribute to the improper feeding of the film across the aperture so that the condition created thereby will not only cause improper projection of the film images, but may create a fire hazard, due to a non-moving portion of the film coming in direct contact with the rays from the arc.

One of the objects of this invention is to provide means whereby the excessive enlargement or diminution of the film loop will actuate mechanism which, in turn, will actuate the safety device for obstructing the rays from the arc.

Another object of the invention is to provide mechanisms which are directly operated by the film for accomplishing the foregoing object.

According to the invention, the motion picture machine which is intended for projecting the images of a film has a loop formed in its film above the aperture plate, the machine is provided with a film guard upon which an electrical switch is mounted, and the mechanism includes means for operating the switch when the loop is excessively enlarged, and mechanism for operating the switch when the loop is excessively diminished.

The drawings illustrate an embodiment of the invention and its adaptability for operating a safety device for obstructing the light rays from the arc when the film loop is enlarged or diminished and the views therein are as follows.

Figure 1:
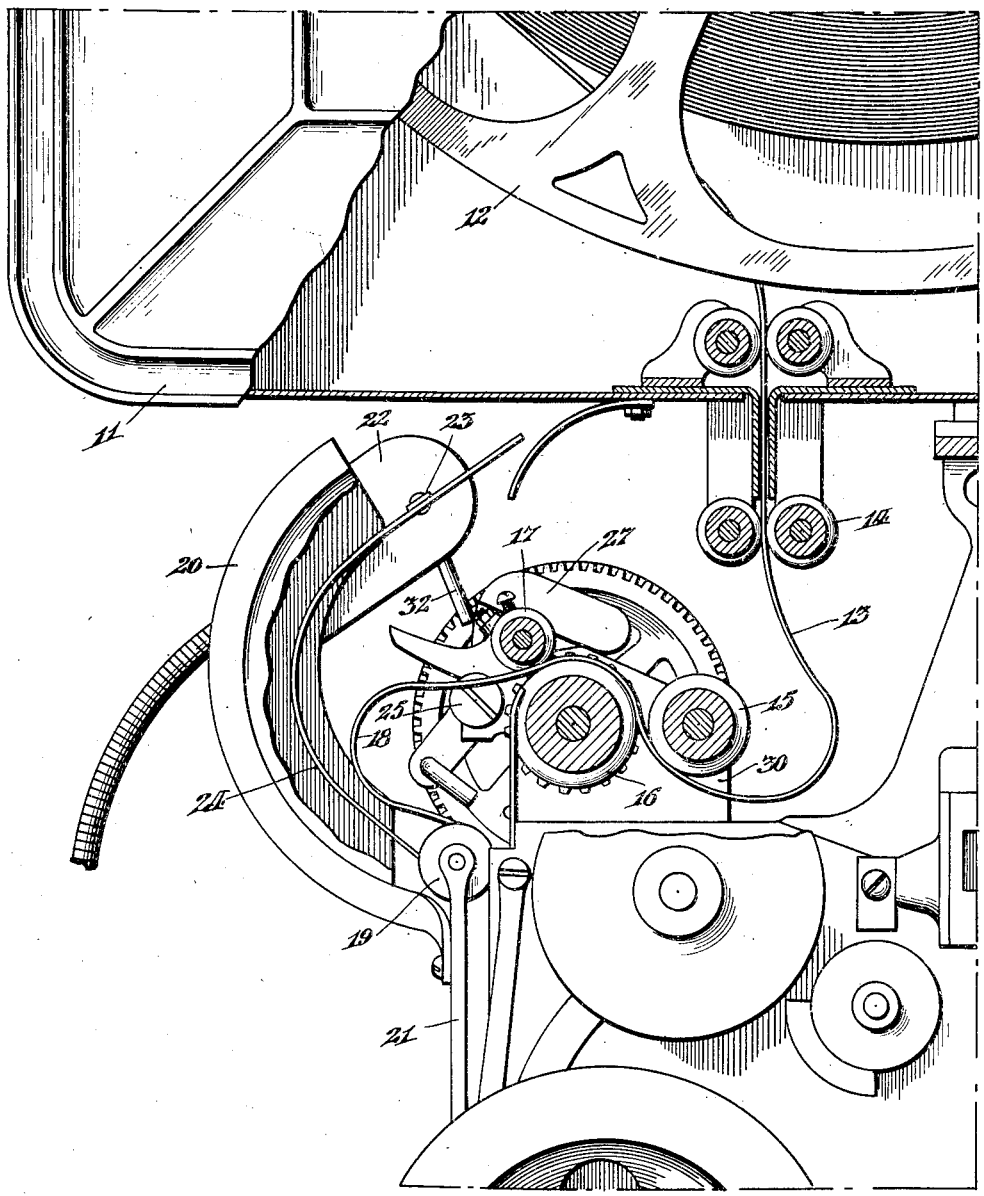
Figure 1 is a fragmentary side view of a motion picture projecting machine showing the improved mechanism associated therewith; certain standard parts of the machine being omitted and other parts broken away in order to expose parts necessary to the disclosure.
Figure 2:
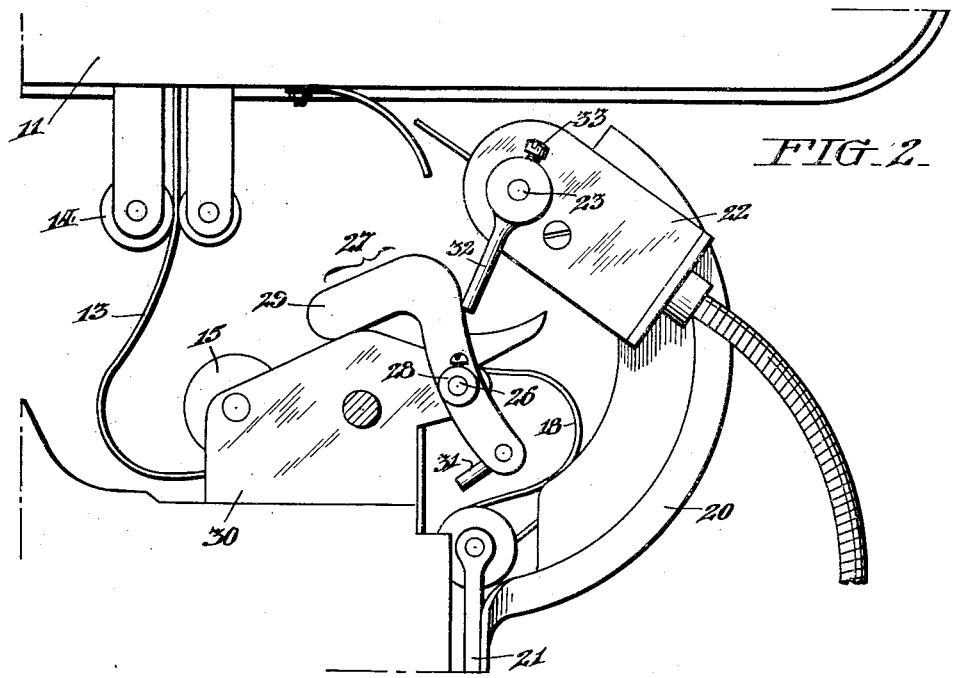
Figure 2 is a fragmentary view of the same machine but viewing same from the opposite side; certain parts being omitted for a better understanding of the invention.
Figure 4:
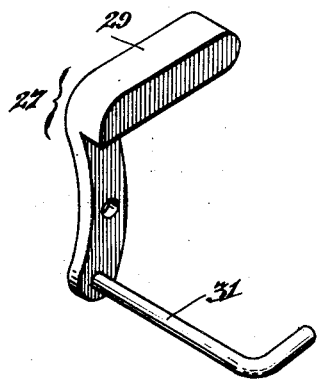
Figure 3:
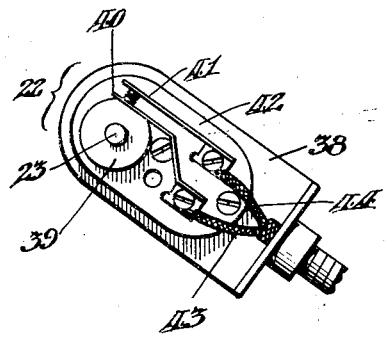
Figure 3 is a side view of a switch, used in connection with our invention, with the cover of the switch casing removed.
Figure 5:
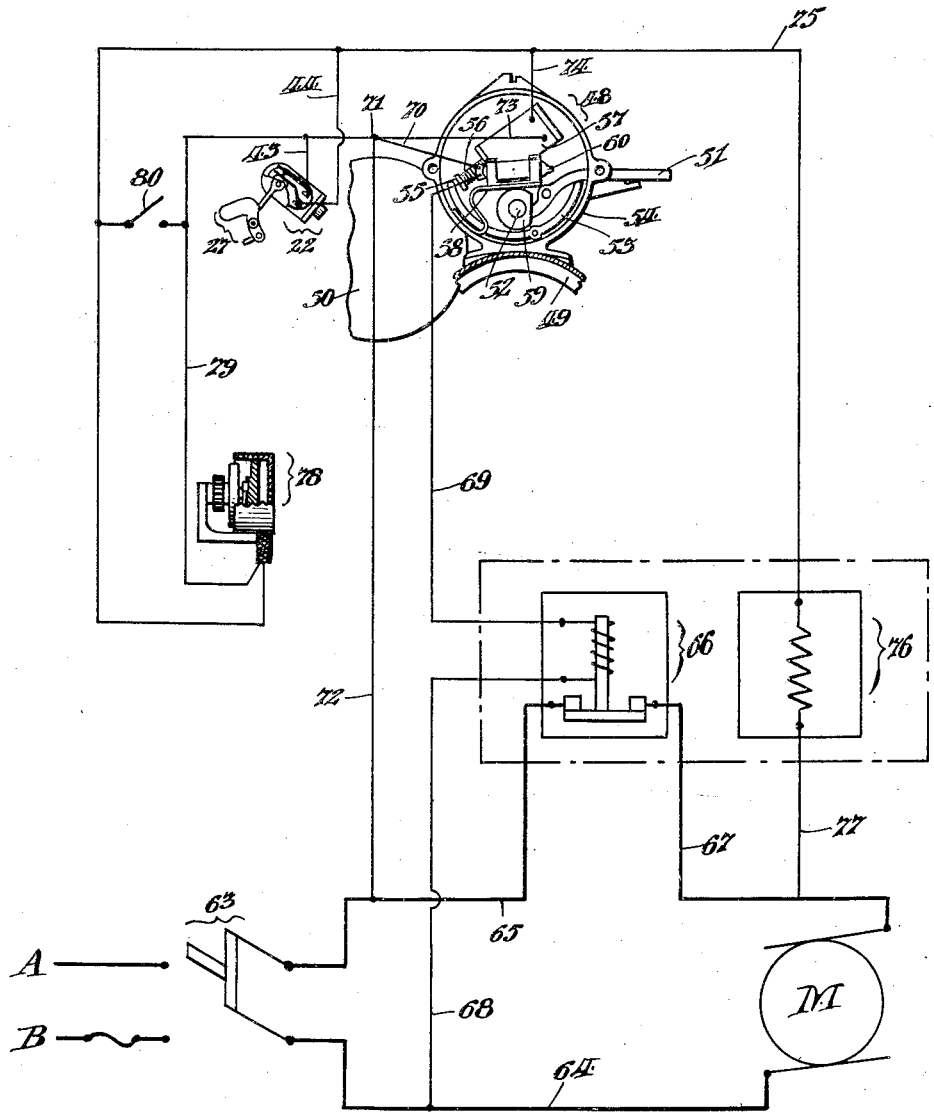

Figure 4 a perspective view of the switch, actuator shown in Figures 1 and 2, and Figure 5 a wiring diagram and schematic drawing, showing the electrical connections of the various elements which constitute the automatic control apparatus with the invention incorporated therein.

Referring now more in detail to the drawings, 11 represents the upper magazine of a motion picture projecting machine having a reel 12 mounted therein from which film 13 is led between guide rollers 14, under a deflector roller 15 and over the upper sprocket 16 with which it is held in contact by a roller 17. From the upper sprocket, the film is formed into a loop 18 and directed by the flanged roller 19 past the projection aperture to the intermittent sprocket (not shown) in the usual manner; loop 18 being accommodated by a guard 20 mounted on the gate 21. This is standard mechanism.

In applying our invention to a projecting machine, it is found advantageous to secure the switch 22 to one side of loop guard 20 with its shaft 23 extending above the path of film 13 and having fixed thereto a contact plate 24 which is curved somewhat in the shape of loop guard 20 and disposed in front of loop 18 and disposed within the loop guard so that, if film 13 should break, the broken end of the film would strike contact plate 24 and actuate switch 22.

It sometimes happens that, due to a defective film or other causes, the film is fed faster by the intermittent sprocket than by sprocket 16 with the result that loop 18 is lost or eliminated and the film caused to tear or break. In order to prevent this, a screw 25, having a plain end 26, is substituted for the screw furnished with the machine and the actuator 27, shown in Figure 6, mounted upon the plain end 26 and held against movement longitudinally of the screw by a set screw extending through a collar 28.

The weighted arm 29 of the actuator 27 normally rests upon a bracket 30, and a bar 31 fixed in the depending arm of the actuator extends within the loop 18 parallel with the width of the film. The bar 31, which has its end bent for facilitating the threading of the film through the projecting machine, is adapted to be engaged by the film whenever loop 18 is sufficiently diminished and it will swing the actuator 27 against a finger 32 secured on the switch shaft 23. This finger is maintained against rotation on the said shaft by a set screw 33. Whenever loop 18 increases in size or the film breaks, the contact plate 24 will be engaged thereby and will rotate the shaft 23 to close the switch 22, or, if the loop 18 is sufficiently diminished, actuator 27 will engage finger 32 and close switch 22 which is electrically connected into an automatic control system as will be hereinafter described.

The switch shaft 23 is rotatably mounted in the casing 38 of switch 22 and provided with a cam 39 which engages a terminal 40 normally spaced from the other terminal 41; both terminals being preferably mounted upon an insulating core 42 and connected to wires 43 and 44 forming parts of an electric circuit which is closed at this point when cam 39 rotates and forces terminal 40 against terminal 41.

Our improved switch is here shown in conjunction with an automatic control apparatus having a main unit or safety device 48 adapted to be mounted upon the cone 49 of the lamp house used with a motion picture projecting machine. Safety device 48 is provided with a dowser 50 adapted to swing in front of cone 49 and intercept the rays of light passing through the film but normally held out of light obstructing position by a trip arm 51 engaging a catch (not shown) secured to the shaft 52 on which dowser 50 is attached.

A crank 53 is rockably mounted in the casing 54 below trip arm 51 and adapted to actuate same and release dowser 50 when its other end is engaged by a plunger 55 which is normally held away from crank 53 against the action of a spring 56 by a solenoid 57. A spring bearing 58, having one end secured to casing 54 and its other end supported by a cam 59 fixed on shaft 52, supports a mercury switch 60 so that, when dowser 50 falls, cam 59 will be rotated and allow spring bearing 58 to tilt switch 60 and break the electric circuit into which it is connected.

Power for operating the projecting machine and the automatic control device has been shown as being derived from a power line A—B through a switch 63 which has one of its poles connected by a wire 64 to one side of the motor M, which drives the projecting machine, and its other pole connected by wire 65 to one side of a relay 66 having its other side connected to the other side of motor M by a wire 67, so that, when relay 66 is closed, motor M may be supplied with power.

One end of the winding of relay 66 is connected to wire 64 by a wire 68 and its other end is connected by wire 69 to one of the terminals of mercury switch 60. The other terminal of mercury switch 60 is connected by wire 70 to a junction 71 which is connected by a wire 72 to wire 65 so that, when switch 60 is closed, the winding of relay 66 will be energized and the motor circuit held closed.

One end of the winding of solenoid 57 is connected by a wire 73 to junction 71 and the other end of its winding connected by a wire 74 to a wire 75 which is connected to a resistance 76 connected to wire 67 by wire 77. When the motor circuit is complete and switch 60 closed, solenoid 57 will be energized by a current flowing from wire 67 through wire 77, resistance 76, wire 75, wire 74, the winding of the solenoid, wire 73, junction 71, wire 70, switch 60, wire 69, the winding of relay 66 and wire 68 to wire 64 so that plunger 55 is held away from crank 53 when the circuits are closed.

The other end of wire 75 is connected to one terminal of a centrifugal switch 78 whose other terminal is connected to junction 71 by a wire 79. Switch 22 is connected to wire 75 by wire 44 and to wire 79 by wire 43, thus putting it in parallel with switch 78 and solenoid 57 while a second film actuated switch 80 is connected in parallel therewith between wires 75 and 79 as diagrammatically shown.

Switch 80 is disposed below the projection aperture of the projecting machine and is adapted to be actuated if the film should break or tear at this point or between it and switch 22. Centrifugal switch 78 is mechanically connected to a rotating part of the projecting machine and adapted to close whenever the speed of the film falls below a certain number of feet per minute. Switches 22, 78 and 80 being connected in parallel, the closing of any one of them will cause the actuation of safety device 48 by allowing a rush of current to flow through wire 75 and the switch involved to junction 71, thus short-circuiting solenoid 57 and depriving same of a portion of the power required by it to hold plunger 55 against the action of spring 56 and allowing spring 56 to thrust plunger 55 against the end of crank 53 and trip dowser 50 which will fall, intercept the rays of light passing through the film, rotate cam 59 and tilt switch 60, breaking the circuit at this point and deenergizing relay 66 and allowing the relay to open and deprive the motor of its power.

It is, of course, understood that the safety device operating mechanisms illustrated may be modified and changed in various ways without departing from the invention herein set forth and hereafter claimed.

We claim:—

1. In a motion picture machine for projecting images from a film wherein the film is provided with a loop, means for making and breaking an electric circuit including a switch having a shaft, spring terminals, and a cam on the shaft adapted to force the terminals together; a curved plate fixed on the shaft and disposed adjacent the outside of the loop; a finger fixed on the shaft; and an actuator extending inside the loop and adapted to engage the finger.

2. In a motion picture machine for projecting images from a film wherein the film in provided with a loop, said machine having a safety device including a dowser adapted to operate to obstruct the light rays upon the closing of an electric circuit, a switch having a cam mounted on a shaft for closing switch terminals, a plate fixed on said shaft and disposed without said loop, whereby said switch is operated by the excessive enlargement of said loop to close said circuit, a finger on said shaft and an actuator disposed within said loop for engaging said finger whereby said switch is operated by the excessive diminution of said loop to close said circuit.

3. In a motion picture machine for projecting images from a film wherein the film is provided with a loop, means for making and breaking an electric circuit including a switch having a shaft, spring terminals, and a cam on the shaft adapted to force the terminals together, a plate fixed on the shaft to rotatably operate the cam shaft upon the enlargement of the loop, a finger fixed on the shaft, and an actuator extending inside the loop and adapted to engage the finger.

4. In a motion picture machine for projecting images from a film wherein the film is provided with a loop, an electric circuit including a switch for making and breaking the said circuit, said switch having a shaft, spring terminals normally separated and a cam on the shaft adapted to force the terminals together, a curved plate on the shaft to operate the switch upon enlargement of said loop, a finger fixed on the shaft, and a pivotally mounted actuator having a bar for engagement by the film, said actuator being adapted to engage said finger to operate said cam and force said terminals together when the film engages said bar.

In testimony whereof we have signed our names to this specification.

THOMAS T. ALLEN.
JOHN FRANCIS ADAMS.